United States Patent [19]

Howeth

[11] Patent Number: 4,679,604
[45] Date of Patent: Jul. 14, 1987

[54] SHEAR BLADE CUTTING DEVICE WITH ADJUSTING BLADE ALIGNMENT COMPENSATOR

[76] Inventor: D. Franklin Howeth, 2901 St. Louis Ave., Fort Worth, Tex. 76110

[21] Appl. No.: 860,136

[22] Filed: May 6, 1986

[51] Int. Cl.⁴ ............................................. A01G 23/08
[52] U.S. Cl. .................... 144/34 E; 83/699; 144/339
[58] Field of Search ............... 144/3 D, 34 R, 34 E, 144/339; 83/699

[56] References Cited

U.S. PATENT DOCUMENTS 4,031,934  6/1977  Stadler .................................. 83/699
4,108,224  8/1978  Wirt .................................. 144/34 E Primary Examiner—W. D. Bray
Attorney, Agent, or Firm—Hubbard, Thurman, Turner & Tucker

[57] ABSTRACT

Disclosed is a shear blade cutting apparatus. The apparatus includes a frame assembly having a pair of shear blades pivotally mounted thereto. Actuators are connected between the shear blades and the frame assemblies for moving the shear blades between open and closed positions in pincer-like fashion. The cutting apparatus includes compensator assemblies for adjusting the connection between the actuators and the frame assembly, thereby to adjust the position of the shear blades relative to each other.

13 Claims, 4 Drawing Figures

SHEAR BLADE CUTTING DEVICE WITH ADJUSTING BLADE ALIGNMENT COMPENSATOR

BACKGROUND OF THE INVENTION

A. Field of the Invention

The present invention relates generally to apparatus for cutting cylindrical articles such as trees or underwater piles, or the like, and more particularly to a shear blade cutting apparatus having means for adjusting blade alignment and compensating for wear.

B. Description of the Prior Art

Shear blade cutting devices have been developed for cutting cylindrical wooden articles. For examples, in U.S. Pat. No. 4,168,729, there is disclosed a shear blade device for cutting underwater piles. In U.S. Pat. No. 3,640,322, there is disclosed a similar shear blade device for cutting trees.

Both the devices of U.S. Pat. Nos. 4,168,729 and 3,640,322 patents include a frame assembly having a pair of shear blades pivotally mounted thereto. Powerful hydraulic actuators are provided for moving the shear blades in pincer-like fashion with respect to each other.

In order to effectively cut the tree or pile, it is necessary that the shear blades substantially meet each other when the cutting device is enclosed, but it is also important that the shear blades do not overtravel each other. The apparatus of the U.S. Pat. No. 3,640,322 provides for blade alignment and prevents overtravel by including a heavy rib about the edges of the shear blades. The ribs act as a stop and allow the blades to travel toward each other until they just meet.

There are a number of shortcomings associated with the shear blade cutting apparatus of the prior art. Neither the apparatus of the U.S. Pat. No. 4,168,729 nor of the U.S. Pat. No. 3,640,322 has any means for compensating for wear of the blades or other parts of the apparatus during use. If the blades of, for example, the U.S. Pat. No. 3,640,322 apparatus become damaged to the extent that they do not meet when the stops formed by the ribs engage each other, the blades must be replaced. Also, in either the apparatus of the U.S. Pat. No. 4,168,729 or U.S. Pat. No. 3,640,322, if the connections between the various parts become worn such that the blades do not meet, it is necessary to overhaul the apparatus completely.

It is therefore an object of the present invention to provide a shear blade cutting device that overcomes the shortcomings of the prior art. More specifically, it is an object of the present invention to provide a shear blade cutting device having means for adjusting blade alignment and compensating for wear of its various parts.

SUMMARY OF THE INVENTION

Briefly stated, the foregoing and other objects are accomplished by the cutting apparatus of the present invention. The apparatus includes a frame assembly having a pair of shear blades pivotally mounted thereto and movable with respect to each other in pincer-like fashion. A pair of actuators are connected between the frame assembly and each of the shear blades for moving the blades with respect to each other. Adjustment compensators are included for adjusting the connection between the actuators and the frame assembly or shear blades.

In the preferred embodiment, the adjustment compensators include a boss rotatably mounted to the frame assembly. The boss carrier at an eccentric position the actuator pin by which the actuator is connected to the frame assembly. Thus, rotation of the boss with respect to the frame assembly effectively changes the point of attachment of the actuator to the frame assembly. The boss is fixable at a plurality of orientations, thereby to fix the point of attachment of the actuator.

DESCRIPTION OF THE PREFERRED EMBODIMENT

Figure 1:
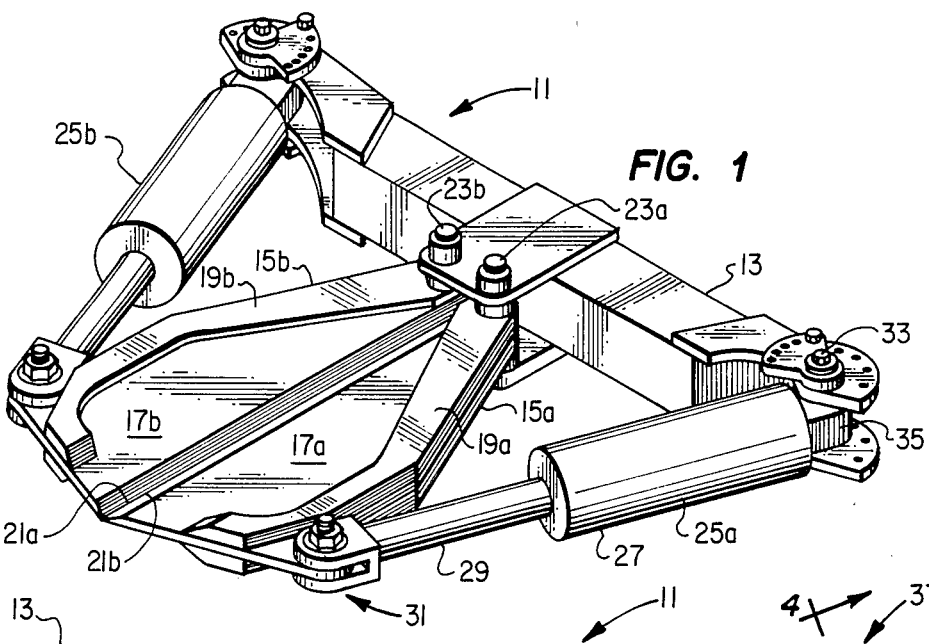
FIG. 1 is a perspective view of the cutting apparatus of the present invention.

Referring now to the drawing, the cutting apparatus of the present invention is designated generally by the numeral 11. Cutting apparatus 11 includes a frame assembly 13 having a pair of shear blades 15a and 15b pivotally mounted thereto. Shear blades 15a and 15b each include flat cutting blade portions 17a and 17b, respectively, and reinforcing ribs 19a and 19b, respectively, which extend partially around the outer perimeter of shear blades 15a and 15b. Each cutting blade portion 17a and 17b includes a cutting edge 21a and 21b.

Figure 2:
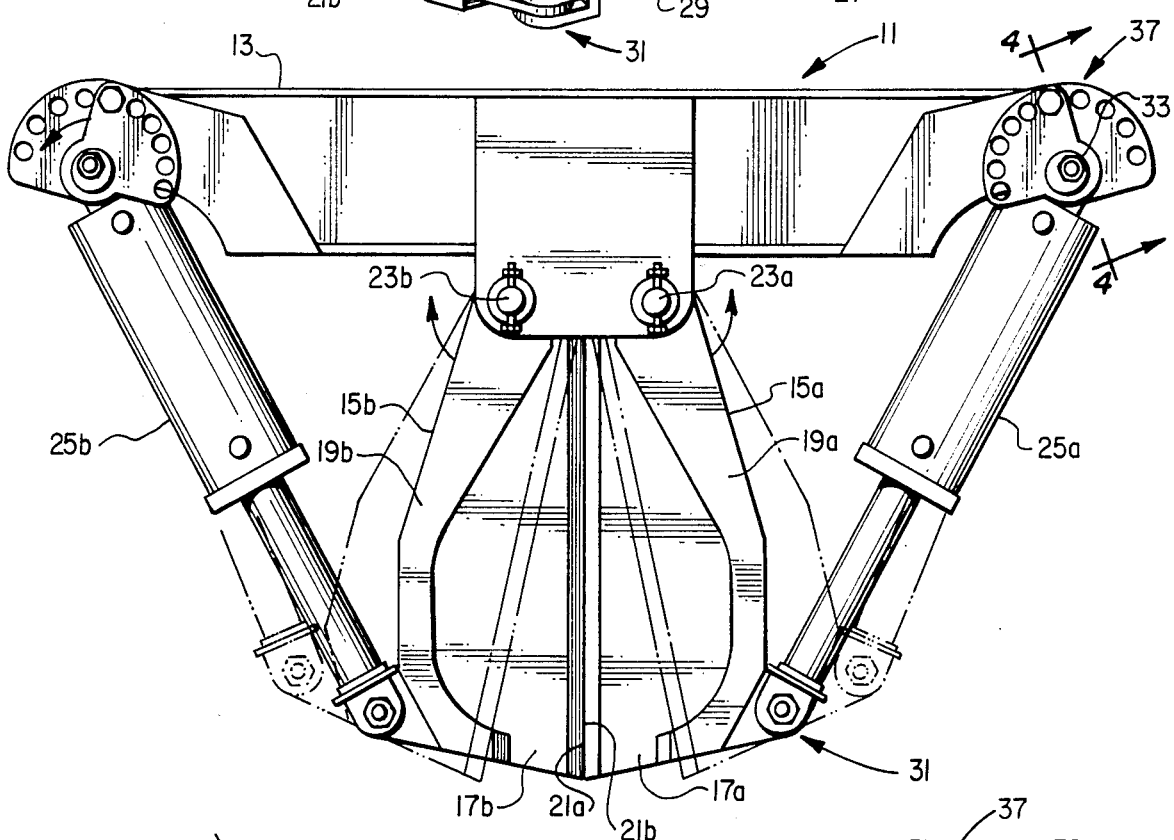
FIG. 2 is a top view of the cutting apparatus of the present invention.

Shear blades 15a and 15b are pivotal about pivot points 23a and 23b, respectively, between a closed position, as shown in FIG. 1, and an open position, as suggested by phantom lines in FIG. 2. In the closed position, cutting edges 21a and 21b just meet.

Shear blades 15a and 15b are moved between their open and closed positions by powerful hydraulic actuators 25 and 25b, respectively. Hydraulic actuators 25a and 25b are double acting and each includes a cylinder 27 and a rod 29. The rods 29 are connected to shear blades 15a and 15b by a clevis and pin arrangement designated generally by the numeral 31. Similarly, cylinders 27 are connected to frame assembly 13 by a pin or bolt 33 which engages the base 35 of cylinder 27. Actuators 25a and 25b thus act between frame assembly 13 at bolt 33 and shear blades 15a and 15b at clevis and pin arrangement 31 to move blades 15a and 15b between the open and closed positions.

Figure 3:
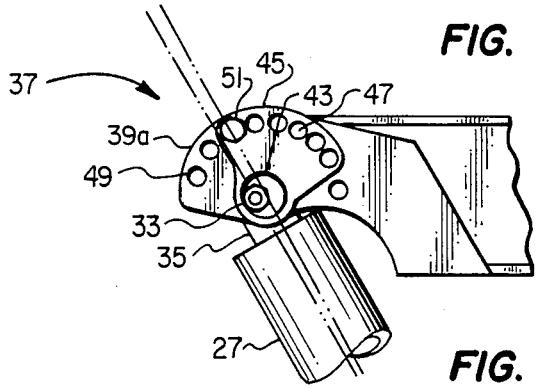
FIG. 3 is a detailed view showing one of the adjustment compensators of the apparatus in a different position from that of FIG. 2.
Figure 4:
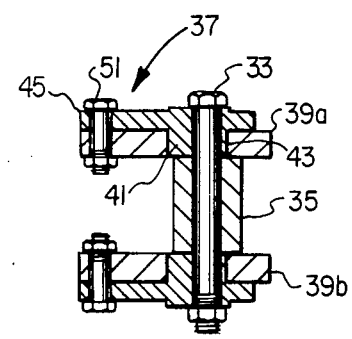
FIG. 4 is a detailed sectional view taken along line 4—4 of FIG. 2 of an adjustment compensator of the present invention.

Cutting apparatus 11 includes compensator assemblies 37 which adjust the point of attachment of base 35 of cylinders 27 to frame assembly 13. Referring particularly to FIGS. 3 and 4, each compensator assembly 37 includes spaced apart mounting plates 39a and 39b connected to frame assembly 13. Each mounting plate 39a and 39b includes a circular hole 41 which carries a cylindrical boss 43. Boss 43 in turn carriers actuator pin 33. Thus, rotation of boss 43 within hole 41 causes movement of actuator pin 33 relative to frame assembly 13 to adjust the position of cylinder pin 33 with respect to the pivot points 23 of blades 15.

Boss 43 is fixable at a plurality of orientations with respect to frame assembly 13 by a plate 45. Plate 45 includes a plurality of holes 47 spaced angularly apart at a constant radius from the center of boss 43. Mounting plate 39a includes a plurality of holes 49 spaced angularly apart along a constant radius from the center of hole 41. Holes 47 and 49 are located on the same radius but it will be noted that the angular spacing between holes 47 of boss plate 45 is less than the angular spacing of holes 49 of mounting plate 39a. Thus, at substantially any orientation of boss 43, one hole 47 will be in registry with one hole 49. Mounting plate 39 and boss plate 45 are locked together by bolts 51.

While in the preferred embodiment, a pair of bosses 43 are disclosed mounted in frame assembly 13, those skilled in the art will recognize that bosses 43 may be mounted in shear blades 15. If desired, only one boss 43 may be provided such that one shear blades is adjustable with respect to the other. Also, one of the shear blades may be fixed with the other shear blade being movable.

In operation, with bolts 51 removed, hydrualic actuators 25a and 25b are powered to their fully extended positions. Bosses 43 are then rotated until cutting blades 21a and 21b just meet whereupon bolts 51 are inserted into the holes 47 and 49 that are in registry with each other. At that point, cutting apparatus 11 is operational. If, due to wear, cutting edges 21a and 21b no longer meet, bolts 51 are removed and bosses 43 are again rotated until cutting blades 21a and 21b are properly aligned. Thus, cutting apparatus 11 may be kept in good working order over a substantial period of time by simple adjustment of compensator assemblies 37.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reverse, and certain features of the invention may be utilized independently of the use of other features, all as would be apparent to one skilled in the art after having the benefit of this description of the invention.

What is claimed is:

1. A cutting apparatus, which comprises:
a frame assembly;
a pair of shear blades mounted to said frame assembly, with at least one of said shear blades being pivotally mounted to said frame assembly and movable with respect to the other of said shear blades in pincer-like fashion;
actuator means connected between said frame assembly and said pivotally mounted blade for moving said pivotally mounted shear blade with respect to said other shear blade;
and means for adjusting the connection of said actuator means to one of said frame assembly or said pivotally mounted shear blade to adjust the movement of said pivotally mounted shear blade with respect to said other shear blade.

2. The cutting apparatus as claimed in claim 1, wherein said adjusting means includes:
a boss rotatably mounted to said frame assembly;
an actuator pin eccentrically mounted in said boss, with said actuator means being connected to said actuator pin; and
means for non-rotatably fixing said boss at a plurality of locations.

3. The cutting apparatus as claimed in claim 2, wherein said boss is mounted to said frame assembly.

4. The cutting apparatus as claimed in claim 1, wherein both of said shear blades are pivotally mounted to said frame assembly.

5. The cutting apparatus as claimed in claim 4, wherein said actuator means includes a pair of fluid operated actuators.

6. The cutting apparatus as claimed in claim 5, wherein said adjusting means includes:
a pair of bosses rotatably mounted to said frame assembly, each of said bosses including an eccentrically positioned actuator pin having one of said actuators connected thereto;
and means for fixing said bosses at a plurality of positions with respect to said frame assembly.

7. The cutting apparatus as claimed in claim 6, wherein said fixing means includes:
a boss plate non-rotatably connected to each of said bosses and means for connecting said boss plate to said frame assembly.

8. The cutting apparatus as claimed in claim 7, wherein said means for connecting said boss plate to said frame assembly includes a plurality of bolt holes formed in said boss plate and at least one bolt hole formed in said frame assembly.

9. The cutting apparatus as claimed in claim 8, wherein said frame assembly includes a plurality of bolt holes.

10. The cutting apparatus as claimed in claim 8 wherein:
said bolt holes of said boss plate are disposed at an equal radius from the center of said boss and are spaced apart from each other at a first angle;
and said frame assembly includes a plurality of bolt holes disposed at a radius from the center of said boss plate equal to the radius at which said boss plate bolt holes are disposed from said center of said boss and said bolt holes of said frame assembly are spaced apart from each other at a second angle different from said first angle.

11. A cutting apparatus, which comprises:
a frame assembly;
a pair of shear blades pivotally mounted to said frame assembly and movable with respect to each other in pincer-like fashion;
a pair of bosses rotatably mounted to said frame assembly;
an actuator pin eccentrically mounted in each of said bosses;
means for fixing each of said bosses at a plurality of positions with respect to said frame assembly;
a pair of actuator assemblies mounted between said actuator pins and said blades for moving said blades with respect to each other.

12. The cutting apparatus as claimed in claim 11, wherein said means for fixing said bosses with respect to said frame assembly includes:
a boss plate connected to each of said bosses, one of said boss plate or said frame assembly having a plurality of bolt holes and the other of said boss plate and frame assembly having at least one bolt hole;
and bolt means for engaging a bolt hole of said boss plate and a bolt hole of said frame assembly.

13. The cutting apparatus of claim 12, wherein:
each of said boss plate and frame assembly includes a plurality of bolt holes, with the bolt holes of said boss plate and frame assembly being spaced at an equal radius from the center of said boss and the angular spacing between the bolt holes of said boss plate being different from the angular spacing between the bolt holes of said frame assembly.

* * * * *